(12) United States Patent
Norberg et al.

(10) Patent No.: US 10,415,678 B2
(45) Date of Patent: Sep. 17, 2019

(54) BRAKE ARRANGEMENT FOR AN UPSHIFT PROCESS IN A GEARBOX

(71) Applicant: Scania CV AB, Södertälje (SE)

(72) Inventors: Peer Norberg, Södertälje (SE); Daniel Häggström, Södertälje (SE)

(73) Assignee: Scania CV AB, Södertälje (SE)

( * ) Notice: Subject to any disclaimer, the term of this patent is extended or adjusted under 35 U.S.C. 154(b) by 188 days.

(21) Appl. No.: 15/555,288

(22) PCT Filed: Apr. 22, 2016

(86) PCT No.: PCT/SE2016/050357
§ 371 (c)(1),
(2) Date: Sep. 1, 2017

(87) PCT Pub. No.: WO2016/175698
PCT Pub. Date: Nov. 3, 2016

(65) Prior Publication Data
US 2018/0038463 A1 Feb. 8, 2018

(30) Foreign Application Priority Data

Apr. 29, 2015 (SE) ...................................... 1550526

(51) Int. Cl.
*F16H 61/04* (2006.01)
*F16H 37/04* (2006.01)
*F16H 3/12* (2006.01)

(52) U.S. Cl.
CPC .............. *F16H 37/046* (2013.01); *F16H 3/12* (2013.01); *F16H 61/0403* (2013.01); *F16H 2003/123* (2013.01); *F16H 2061/0411* (2013.01)

(58) Field of Classification Search
None
See application file for complete search history.

(56) References Cited

U.S. PATENT DOCUMENTS

| 5,052,991 A | 10/1991 | Yamaguchi et al. |
| 6,017,291 A * | 1/2000 | Ailes ........................ F16H 3/12 477/124 |

(Continued)

FOREIGN PATENT DOCUMENTS

| DE | 19627895 C1 | 7/1996 | |
| EP | 2243983 A3 * | 2/2011 | ............. F16H 3/006 |
| JP | 5434686 B2 | 3/2014 | |

OTHER PUBLICATIONS

Scania CV AB, Korean Application No. 10-2017-7033232, Office Action, dated Jan. 29, 2019.

(Continued)

*Primary Examiner* — Dirk Wright
(74) *Attorney, Agent, or Firm* — Moore & Van Allen PLLC; W. Kevin Ransom

(57) ABSTRACT

A brake arrangement for a gearbox is provided, where the gearbox comprises an input shaft, a counter shaft, a main shaft and a plurality of gear wheels pairs which each comprises a primary gear wheel arranged on the counter shaft and a secondary gear wheel arranged on the main shaft. The brake arrangement further comprises at least two brake units each configured to act with a braking torque on the counter shaft or a component connected to the counter shaft, and a control unit configured to control the activation of the brake units. The control unit is configured to activate the at least two brake units one at a time or both simultaneously during an upshift process in the gear box when a secondary gear wheel of a gear wheel pair to be engaged in the gear box is retarded to a synchronous speed with the main shaft.

20 Claims, 2 Drawing Sheets

(56) References Cited

U.S. PATENT DOCUMENTS

| | | | |
|---|---|---|---|
| 6,766,705 B1 * | 7/2004 | Hall, III | F16H 3/006 74/331 |
| 7,077,024 B2 * | 7/2006 | Lauri | B60W 10/111 74/325 |
| 8,051,735 B2 * | 11/2011 | Bender | F16H 3/0915 74/329 |
| 8,647,232 B2 * | 2/2014 | Guggolz | B60K 6/40 477/34 |
| 2005/0164827 A1 | 7/2005 | Beaty et al. | |
| 2005/0166693 A1 | 8/2005 | Lauri et al. | |
| 2008/0116030 A1 | 5/2008 | Steinborn et al. | |
| 2011/0098151 A1 | 4/2011 | Ziemer | |
| 2012/0031230 A1 | 2/2012 | Guggolz et al. | |

OTHER PUBLICATIONS

International Search Report for PCT/SE2016/050357 dated Jun. 2, 2016.
Written Opinion of the International Searching Authority for PCT/SE2016/050357 dated Jun. 2, 2016.
European Search Report for PCT/SE2016/050357 dated Nov. 26, 2018.
Supplementary European Search Report for PCT/SE2016/050357 dated Nov. 16, 2018.

* cited by examiner

BRAKE ARRANGEMENT FOR AN UPSHIFT PROCESS IN A GEARBOX

CROSS-REFERENCE TO RELATED APPLICATION(S)

This application is a national stage application (filed under 35 § U.S.C. 371) of PCT/SE16/050357, filed Apr. 22, 2016 of the same title, which, in turn claims priority to Swedish Application No. 1550526-6, filed Apr. 29, 2015 of the same title; the contents of each of which are hereby incorporated by reference.

FIELD OF THE INVENTION

The present invention relates to a brake arrangement for an upshift process in a gearbox.

BACKGROUND OF THE INVENTION

A conventional gearbox comprises a main shaft, a counter shaft, and a plurality of gearwheel pairs each comprising a primary gearwheel fixedly arranged on the counter shaft and a secondary gearwheel rotatably arranged on the main shaft. The primary gearwheel and the secondary gearwheel of each gearwheel pair are in constant meshing engagement with each other. A synchronizing unit is used to synchronize the speed of the secondary gear wheels of each gearwheel pairs with the speed of the main shaft and to lock the secondary gear wheel on the main shaft when a synchronous speed has been reached. Usually, a synchronizing unit comprises a conically shaped friction surface connected to the secondary gear wheel and a conically shaped friction surfaces connected to the main shaft. When the conically friction surfaces are engaged, the secondary gear wheel and the main shaft achieve a synchronous speed in a fast manner. However, the friction surfaces of the synchronizing units are subjected to heavy loads resulting in a large wear.

An alternative to use synchronizing units is to use a transmission brake. A transmission brake is normally designed as a multi disc brake. During an upshift process, the transmission brake is used to provide a braking torque on the counter shaft in order to reduce the speed of a secondary gear wheel to be engaged to the speed of the main shaft. As soon as the secondary gearwheel has reached a synchronous speed with the main shaft, the secondary gear wheel is rotationally locked to the main shaft by a locking unit. During a downshift process, the engine is activated such that it provides an acceleration of the counter shaft until a secondary gear wheel to be engaged reaches a synchronous speed with the mains shaft. As soon as the secondary gearwheel has reached a synchronous speed with the main shaft, the secondary gear wheel is rotationally locked to the main shaft by a locking unit.

A conventional transmission brake provides a fixed braking torque on the counter shaft. A gearbox comprising a split gear has a counter shaft with a varying moment of inertia depending on the split gear engaged. It is difficult to dimension a transmission brake providing a fixed braking torque on the counter shaft for such a gearbox. The transmission brake may be dimensioned to the highest moment of inertia of the counter shaft. In this case, the counter shaft receives a very fast retardation, which makes it difficult to disengage the braking torque at the right time with a high accuracy when it has a small moment of inertia. Alternatively, the transmission brake is dimensioned for the lowest moment of inertia. In this case, the counter shaft receives a slow retardation resulting in a long gearshift process when it has a large moment of inertia.

US 2008/0116030 shows a gear brake device for a multi-speed manual transmission. A first gear brake is used during an upshift process. At least one additional auxiliary brake is provided, which acts on an input gear shaft or on a power take off shaft. The auxiliary brake is designed so that it can perform auxiliary functions alone or together with the first gear brake such as a PTO braking function or a hill hold function.

SUMMARY OF THE INVENTION

The object of the present invention is to provide a brake arrangement which makes it is possible to provide a fast braking process of a counter shaft to a desired speed and with a high accuracy during an upshift process in a gearbox.

The above mentioned objects are achieved by the braking arrangement according to the characterizing portion of claim 1. The brake arrangement comprises at least two brake units by which it is possible to brake the counter shaft during an upshift process in the gearbox. It is possible to activate one of the brake units at a time or several brake units simultaneously. Thereby, it is possible to retard the counter shaft with several alternative braking torques at different upshift processes. Furthermore, it is possible to retard the counter shaft with several alternative braking torques during different phases of an upshift process. In a gearbox with a large number of gears, there are lot of options for upshifting. The use of several brake units makes it possible to provide a unique braking process for each possible upshift process in the gearbox. The braking processes may be designed for an optimal tradeoff between performance, accuracy and comfort.

According to an embodiment of the invention, each brake unit is configured to act with a fixed braking torque on the counter shaft or on a component connected to the counter shaft. Such brake units may have a relatively simple design. Preferably, the brake units are configured to act with different fixed braking torques on the counter shaft or on the component connected to the counter shaft. In this case, it is possible to provide a fixed braking torque for each brake unit and several fixed braking torques when several brake units are activated simultaneously.

According to an embodiment of the invention, the control unit has access to stored information about how the at least two brake units should be activated during different upshift processes in the gearbox. It is many times possible to determine a preferable activation of the brake units during all possible upshift processes and during different operational conditions. This information may be stored in an appropriate manner where the control unit has access to said information.

According to an embodiment of the invention, at least one of the brake units is configured to provide a braking torque acting directly on the counter shaft. This brake unit may act as a conventional transmission brake but is could be dimensioned to provide a smaller braking torque to the counter shaft during an upshift process. Said brake unit may be configured to act with a braking torque on an end portion of the counter shaft. It is usually spaces at the end portions of the counter shaft where it is possible to arrange a brake unit. Thus, it is possible to arrange one brake unit at one end portion of the counter shaft and another brake unit at an opposite end portion of the counter shaft.

According to an embodiment of the invention, the at least one of the brake units is configured to act with a braking torque on the input shaft to the gearbox. The input shaft may be in constant engagement with the counter shaft via a transmission in the form of a gearwheel pair. In this case, the brake unit provides a braking torque acting on the counter shaft which is related to the braking torque on the input shaft and the gear ratio of the gearwheel pair.

According to an embodiment of the invention, each brake unit comprises a pneumatic actuator and a brake member to be activated by the pneumatic actuator. Heavy vehicles typically include compressed air sources for different purposes. It is favorable to use such an already existing power source for activating pneumatic actuators and the brake units. The pneumatic actuators may be provided with pistons of different areas. Thereby, it is possible to provide two alternative braking torques from two pneumatic actuators by means of compressed air from one and the same compressed air source. However, it is possible to use other kinds of actuator for activation of the brake units such as hydraulic cylinders or electric engines. The brake member may be a multiple disc brake. However, it is possible to use other kinds of brake member.

According to an embodiment of the invention, at least one of the brake units is configured to act with a braking torque on a component connected to the counter shaft via a transmission provided with at least two different gear ratios. In this case, it is possible to provide the braking torque from a brake unit with at least two different gear ratios. Consequently, the braking torque from such a brake unit may be transformed to at least two alternative braking torques acting on the counter shaft. The transmission may be a split gear engageable in at least two split gears. Certain gearboxes comprises a split gear between the input shaft and the counter shaft. The split gear may be used to give the gears in a gearbox a high split gear and a low split gear.

According to an embodiment of the invention, the split gear may be positionable in a neutral position in which it disengage the connection between the component and the counter shaft. In a conventional gearbox comprising a split gear, the shift process of the ordinary gear in the gearbox and the shift process of the split gear is performed in sequence. The shift process of the ordinary gear is initially performed whereupon the shift process of the split gear is performed. When the split gear is in the neutral position, it is possible to retard the input shaft by one of the brake units and the counter shaft by another of the brake units simultaneously. In this case, it is possible to perform the shift processes of the ordinary gear and the split gear simultaneously, which reduces the time for an upshift process in the gearbox.

The invention relates also to a gearbox comprising a brake arrangement according to any one of the claims 1-13 and a vehicle comprising a gearbox according to claim 14.

BRIEF DESCRIPTION OF THE DRAWINGS

In the following preferred embodiments of the invention are described, as examples, with reference to the attached drawings, on which.

DETAILED DESCRIPTION OF THE INVENTION

Figure 1:
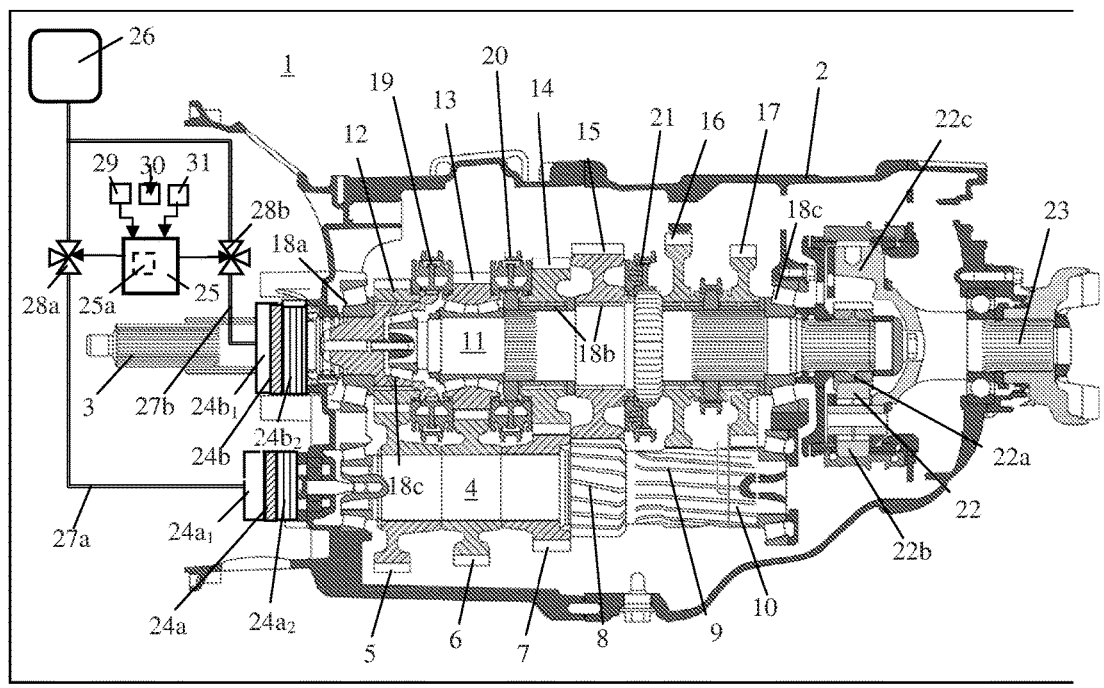
FIG. 1 shows a gearbox with a brake arrangement according to a first embodiment of the invention and FIG. 2 shows a gearbox with a brake arrangement according to a second embodiment of the invention.

FIG. 1 shows a schematically indicated vehicle 1 provided with a gearbox 2. The vehicle 1 can be a heavy vehicle. The gearbox 2 comprises a housing and an input shaft 3 driven by a not shown engine. The input shaft 3 comprises a gear wheel 12. The gearbox comprises further a counter shaft 4 provided with a plurality of gearwheels 5-10 of different sizes. The gearwheels 5-10 are separate units fixedly mounted on the counter shaft 4 or formed as a homogeneous part of the counter shaft 4. The gearwheel 5 on the counter shaft 4 is connected to the gearwheel 12 on the input shaft 3. The gearwheels 5, 12 forms a first gear wheel pair in the gearbox. The gearbox 2 comprises a main shaft 11 provided with a plurality of gearwheels 13-17 of different sizes. The gearwheels 6-10 on the counter shaft 4 is in constant engagement with a gearwheel 13-17 on the main shaft 11 forming a number of additional gearwheel pairs in the gearbox 2. Each additional gearwheel pair includes a primary gearwheel 6-10 fixedly attached on the counter shaft 4 and secondary gear wheel 13-17 rotatably arranged on the main shaft 11.

The gearbox 2 is equipped with a split gear which in a first split position connects the input shaft 3 with the counter shaft 4 via the first gearwheel pair 5, 12 and which in a second split position connects the input shaft 3 with the counter shaft 4 via a second gearwheel pair 6, 13. The second gearwheel pair 6, 13 provides a ratio that defines a third gear in the gearbox 2. The gearbox 2 further includes a third gearwheel pair 7, 14 which defines a second gear in the gearbox 2, a fourth gearwheel pair 8, 15 which defines a first gear in the gearbox 2, a fifth gearwheel pair 9, 16 which defines a creep gear and a sixth gearwheel pair 10, 17 which defines a reverse gear. The sixth gearwheel pair 10, 17 includes an intermediate gearwheel, which provides a reverse rotation of the main shaft 11.

The input shaft 3 is rotatably arranged in the gearbox 2 by means of a roller bearing 18a. The secondary gearwheels 13-17 are rotatably arranged on the main shaft 11 by means of roller bearings 18b that can be needle bearings. The main shaft 11 is rotatably arranged in the gearbox by means of two roller bearings 18c. Locking units 19-21 are disposed adjacent to the secondary gear wheels 12 on the input shaft 3 and the secondary gearwheels 13-15 of the main shaft 11. Each locking unit 19-21 is configured to provide a rotational locking of at least one of the secondary gear wheels 13-15 on the main shaft 11. A first locking unit 19 has the task to establish the different split positions. The first locking unit 19 is able to connect the input shaft 3 to the counter shaft 4 in the gearbox 2, via the first gearwheels pair 5, 12 in a first low split position and, via the second gearwheels pair 6, 13 in a second high split position. A second locking unit 20 is configured to provide a rotational locking of the secondary gearwheels 13, 14 on the main shaft 11. A third locking unit 21 is configured to provide a rotational locking of the secondary gearwheel 15 on the main shaft 11.

Furthermore, it is possible, by the first locking unit 19 and the second locking unit 20, to provide a direct connection between the input shaft 3 and the main shaft 11 and provide a direct-drive gear in the gearbox 2. The gearbox also includes a range gear 22, which is arranged between the main shaft 11 and an output shaft 23 of the gearbox 2. The range gear 22 comprises a sun wheel 22a fixedly arranged on the main shaft 11, planetary wheels 22b and a planetary wheel carrier 22c fixedly connected to the output shaft 23. By means of the range gear 22, all ordinary gears in the gearbox 2 can be provided with a high range gear or a low range gear. Thus, the range gear 22 provides the gearbox 2 with twice as many gears.

The gearbox comprises a brake arrangement in the form of a first brake unit 24a arranged at an end portion of the counter shaft 4. The first brake unit 24a comprises a pneumatic actuator 24a$_1$ and a brake member 24a$_2$. The brake arrangement comprises a second brake unit 24b arranged at an end portion of the input shaft 3. The second brake unit 24b comprises a pneumatic actuator 24b$_1$ and a brake member 24b$_2$. The brake members 24a$_2$, 24b$_2$ may be multi disc brakes. A control unit 25 controls the activation of the brake units 24a, 24b. The pneumatic actuator 24a$_1$ of the first brake unit 24a is connected to a compressed air source 26 via a first compressed air line 27a. The first compressed air line 27a comprises a three way valve 28a controlled by the control unit 25. The pneumatic actuator 24b$_1$ of the second brake unit 24b is connected to the compressed air source 26 via a second compressed air line 27b. The second compressed air line 27b comprises a three way valve 28b controlled by the control unit 25.

The first brake member 24a$_2$ is dimensioned to provide a braking torque $T_1$ to the counter shaft 4 when compressed air is supplied from the compressed air source 26 to the pneumatic actuator 24a$_1$. The second brake member 24b$_2$ is dimensioned to provide a braking torque $T_2$ to the input shaft 3 when compressed air is supplied from the compressed air source 26 to the pneumatic actuator 24b$_2$. The control unit 25 receives information about a number of operational parameters 29 of the vehicle. The operational parameters 29 may include the speed and the load of the engine. The control unit 25 also receives information about the speed 30 of the main shaft and the speed 31 of the counter shaft 4 from a respective sensors or the like.

During operation of the combustion engine, the control unit 25 receives substantially continuously information about said operational parameters 29. The control unit 25 has access to stored information 25a about gears to be engaged at different operational conditions. The control unit 25 controls substantially continuously that the most preferable gear is engaged at current operational condition. If it not the case, the control unit 25 activates a non-indicated actuator and a shift fork which moves the engaged locking unit 19-21 from a locking position to a non-locking position such that the secondary gear wheel 13-17 for the gear to be disengaged is free to rotate on the main shaft 11. The control unit 25 determines if the shifting process is an upshift process or a downshift process. In case it is a downshift process, the control unit 25 activates the combustion engine such it accelerate the input shaft 3 and the counter shaft 4 such that the secondary gear wheel 13-15 of the gearwheel pair to be engaged achieves a corresponding speed as the main shaft 11 whereupon the secondary gearwheel is rotationally locked on the main shaft 11 by one of the locking units 19-21.

In case it is an upshift process, the control unit 25 has access to stored information 25a for all possible upshifts processes about the activation of the brake units 24a, 24b.

The first brake unit 24a provides a braking torque $T_1$ on the counter shaft 4 in an activated state. The second brake unit 24b provides a braking torque $T_2$ on the input shaft 3 in an activated state. In this case, the second pneumatic actuator 24b$_1$ has a piston with a larger active area than the piston of the first pneumatic actuator 24a$_1$. Consequently, the second brake unit 24b provides a larger braking torque $T_2$ on the input shaft 3 than the braking torque $T_1$ provided on the counter shaft 4 by the first brake unit 24a. However, the braking torque $T_2$ acting on the input shaft 3 is to be transferred to the counter shaft 4 via the split gear. When the split gear is in the first low split position the second braking torque $T_2$ is transferred, via the first gearwheel pair 5, 12, to the counter shaft 4. In this case, the second brake unit 24b provides a braking torque $T_{2a}$ acting on the counter shaft 4, which is depending on the gear ratio of the gearwheels 5, 12. When the split gear is in the second high split position the second braking torque $T_2$ is transferred, via the second gearwheel pair 6, 13, to the counter shaft 4. In this case, the second brake unit 24b provides a braking torque $T_{2b}$ acting on the counter shaft 4, which is depending on the gear ratio of the gearwheels 6, 13.

The control unit 25 is able to activate the brake units 24a, b individually or in combination during an upshift process in the gearbox 2. Consequently, the control unit 25 is able to active the first brake 24a unit and provide a braking torque $T_1$ on the counter shaft 4. The control unit 25 is able to active the second brake 24b unit when the split gear is in the low split position and provide a braking torque $T_{2a}$ on the counter shaft 4. The control unit 25 is able to active the second brake 24b unit when the split gear is in the high split position and provide a braking torque $T_{2b}$ on the counter shaft 4. Furthermore, the control unit 25 is able to active the first brake 24a unit and the second brake 24b unit when the split gear is in the low split position and provide a braking torque $T_1+T_{2a}$ on the counter shaft 4. Finally, the control unit 25 is able to active the first brake 24a unit and the second brake 24b unit when the split gear is in the high split position and provide a braking torque $T_1+T_{2b}$ on the counter shaft 4. In this case, the control unit 25 is able to retard the speed of the counter shaft 4 by means of five alternative braking torques. Furthermore, it is possible to use several of the five alternative braking torques during different phases of an upshift process.

When the split gear is in a neutral position, the counter shaft 4 is disengaged from the input shaft 3. In this case, the counter shaft has a first moment of inertia $I_1$. When the split gear is in the high split position, the counter shaft 4 is connected to the input shaft 3 via the second gearwheel pair 6, 13. In this case, the counter shaft 4 has a second moment of inertia $I_2$ which is higher than the first moment of inertia $I_1$. When the split gear is in the low split position, the counter shaft 4 is connected to the input shaft 3 via the first gearwheel pair 5, 12. In this case, the counter shaft 4 has a third moment of inertia $I_3$ that is higher than the second moment of inertia $I_2$. The required braking torque T of the counter shaft 4 is related to the moment of inertial of the counter shaft 4. Consequently, both brake units 24a, b usually need to be activated when the counter shaft 4 has a third moment of inertia $I_3$.

The split gear can be positioned in the neutral position, when an upshift process is to be performed including an upshift of the split gear and an upshift of an ordinary gear in the gearbox 2. The input shaft 3 and the counter shaft 4 are disconnected from each other when the split gear is in the neutral position. In this case, it is possible to retard the counter shaft 4 by the first brake unit 24a and the input shaft 3 by the second brake unit 24b simultaneously. In this case, it is possible to perform the shift processes of the ordinary gear and the split gear simultaneously which reduces the time for the upshift process in the gearbox 2.

Figure 2:
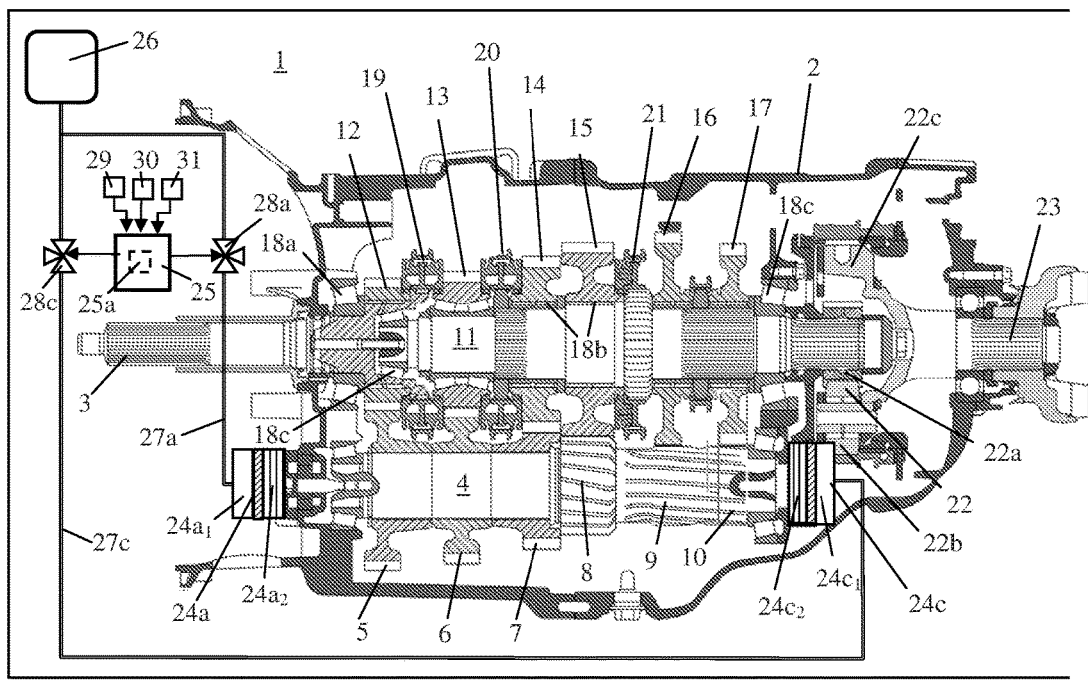

FIG. 2 shows an alternative embodiment of the brake arrangement. The brake arrangement comprises a first brake unit 24a arranged at a first end portion of the counter shaft 4. The first brake unit 24a comprises a pneumatic actuator 24a$_1$ and a brake member 24a$_2$. The brake arrangement comprises a further brake unit 24c arranged at an opposite end portion of the counter shaft 4. The further brake unit 24c comprises a pneumatic actuator 24c$_1$ and a brake member 24c$_2$. The brake members 24a$_2$, 24c$_2$ may be multi disc brakes. A control unit 25 controls the activation of the brake units 24a, 24c. The pneumatic actuator 24a₁ of the first brake unit 24a is connected to a compressed air source 26 via a first compressed air line 27a. The first compressed air line 27a comprises a three way valve 28a controlled by the control unit 25. The pneumatic actuator 24c₁ of the further brake unit 24c is connected to the compressed air source 26 via a second compressed air line 27c. The second compressed air line 27c comprises a three way valve 28c controlled by the control unit 25. The first brake member 24a₂ is dimensioned to provide a braking torque $T_1$ to the counter shaft 4 when compressed air is supplied from the compressed air source 26 to the pneumatic actuator 24a₁. The further brake member 24c₂ is dimensioned to provide a braking torque $T_3$ to the counter shaft 4 when compressed air is supplied from the compressed air source 26 to the pneumatic actuator 24c₂.

The control unit 25 is able to activate the brake units 24a, c individually or in combination during an upshift process in the gearbox 2. Consequently, the control unit 25 is able to active the first brake 24a unit and provide a braking torque $T_1$ on the counter shaft 4. The control unit 25 is able to active the further brake 24c provide a braking torque $T_3$ on the counter shaft 4. The control unit 25 is able to active the first brake 24a unit and the further brake unit 24c and provide a braking torque $T_1+T_3$ on the counter shaft 4. In this case, the control unit 25 is able to retard the speed of the counter shaft 4 during different upshift processes in the gearbox 2 by means of three alternative braking torques. Furthermore, it is possible to use several alternative braking torques during different phases of an upshift process.

It has many advantages to use more than one brake unit for braking the counter shaft during an upshift process is in a gearbox. It is, for example, possible to adapt the braking torque to the moment of inertias of the counter shaft in gearboxes in cases where the counter shaft has a variable moment of inertia. In this case, a high braking torque is applied when the counter shaft 4 has a high moment of inertia and a low braking torque is applied when the counter shaft 4 has a low moment of inertia.

Furthermore, it is possible to apply a high braking torque during an initial phase of a braking process of the counter shaft 4 and a lower braking torque during a final part of the braking process. In this case, it is possible to provide a fast braking process with a high accuracy. It is also possible to select between a fast upshift process with less comfort and a slower upshift process with higher comfort during different operational conditions. A high braking torque results in a fast upshift process and a low braking torque results in higher accuracy and a higher comfort.

When the braking arrangement provides a high braking torque several brake unit are to be activated. In this case, several air inlets are used to fill the pneumatic actuators and several air outlets are used to empty the pneumatic actuators. The total flow area of the air inlets and the air outlets are usually larger than the flow area of the air inlet and the air outlet of a single pneumatic actuator used in a conventional transmission brake. As a consequence, the time for activation and deactivation of the brake units will be faster for the brake arrangement than for a conventional transmission brake. When the braking arrangement provides a low braking torque only one of the brake unit is activated. In this case, the required air quantity to fill the pneumatic actuator and to empty the pneumatic actuator is smaller than the required air to fill a larger pneumatic actuator of a conventional transmission brake. Also in this case, the time for activation and deactivation of the brake unit will be faster for the brake arrangement than for a conventional transmission brake.

The invention is not restricted to the described embodiment but may be varied freely within the scope of the claims. It is, for example, possible to use more than two brake

The invention claimed is:

1. A brake arrangement for a gearbox, wherein the gearbox comprises an input shaft, a counter shaft, a main shaft and a plurality of gear wheels pairs which each comprises a primary gear wheel arranged on the counter shaft and a secondary gear wheel arranged on the main shaft, wherein the brake arrangement comprises:
   at least two brake units each configured to act with a braking torque on the counter shaft or a component connected to the counter shaft; and
   a control unit configured to control the activation of the brake units, wherein the control unit is configured to activate the at least two brake units one at a time or both simultaneously during an upshift process in the gear box when a secondary gear wheel of a gear wheel pair to be engaged in the gear box is retarded to a synchronous speed with the main shaft.

2. A brake arrangement according to claim 1, wherein the at least two brake units are configured to act with a fixed braking torque on the counter shaft or a component connected to the counter shaft.

3. A brake arrangement according to claim 1, wherein the at least two brake units are configured to act with different braking torques on the counter shaft or a component connected to the counter shaft.

4. A brake arrangement according to claim 1, wherein the control unit has access to stored information about how the at least two brake units should be activated during different upshift processes in the gearbox.

5. A brake arrangement according to claim 1, wherein at least one of the brake units (24a, c) is configured to act with a braking torque on the counter shaft.

6. A brake arrangement according to claim 5, wherein at least one of the brake unit is configured to act with a braking torque on an end portion of the counter shaft.

7. A brake arrangement according to claim 1, wherein at least one of the brake units is configured to act with a braking torque on the input shaft to the gearbox.

8. A brake arrangement according to claim 1, wherein each brake unit comprises a pneumatic actuator and a brake member to be activated by the pneumatic actuator.

9. A brake arrangement according to claim 8, wherein pneumatic actuators of the brake units are provided with pistons of different sizes.

10. A brake arrangement according to claim 8, wherein the brake members are a multiple disc brake.

11. A brake arrangement according to claim 1, wherein at least one brake unit is configured to provide a braking torque on a component connected to the counter shaft by means of a transmission by which it is possible to provide at least two different gear ratios between the component and the counter shaft.

12. A brake arrangement according to claim 11, wherein the transmission is a split gear engageable in at least two split gears.

13. A brake arrangement according to claim 12, wherein the split gear is positionable in a neutral position in which it disengage the connection between the component and the counter shaft.

14. A gearbox system comprising:
   a gearbox comprising:
      an input shaft;
      a counter shaft;
      a main shaft; and a plurality of gear wheels pairs which each comprises a primary gear wheel arranged on the counter shaft and a secondary gear wheel arranged on the main shaft; and a brake arrangement comprising:

at least two brake units each configured to act with a braking torque on the counter shaft or a component connected to the counter shaft; and a control unit configured to control the activation of the brake units, wherein the control unit is configured to activate the at least two brake units one at a time or both simultaneously during an upshift process in the gear box when a secondary gear wheel of a gear wheel pair to be engaged in the gear box is retarded to a synchronous speed with the main shaft.

15. A vehicle comprising:

a gearbox comprising:

an input shaft;

a counter shaft;

a main shaft; and a plurality of gear wheels pairs which each comprises a primary gear wheel arranged on the counter shaft and a secondary gear wheel arranged on the main shaft; and a brake arrangement comprising:

at least two brake units each configured to act with a braking torque on the counter shaft or a component connected to the counter shaft; and a control unit configured to control the activation of the brake units, wherein the control unit is configured to activate the at least two brake units one at a time or both simultaneously during an upshift process in the gear box when a secondary gear wheel of a gear wheel pair to be engaged in the gear box is retarded to a synchronous speed with the main shaft.

16. A gear box system according to claim 14, wherein the at least two brake units of the brake arrangement are configured to act with a fixed braking torque on the counter shaft or a component connected to the counter shaft.

17. A gear box system according to claim 14, wherein the at least two brake units of the brake arrangement are configured to act with different braking torques on the counter shaft or a component connected to the counter shaft.

18. A gear box system according to claim 14, wherein the control unit has access to stored information about how the at least two brake units should be activated during different upshift processes in the gearbox.

19. A vehicle according to claim 15, wherein the at least two brake units of the brake arrangement are configured to act with a fixed braking torque on the counter shaft or a component connected to the counter shaft.

20. A vehicle according to claim 15, wherein the at least two brake units of the brake arrangement are configured to act with different braking torques on the counter shaft or a component connected to the counter shaft.

* * * * *